(12) United States Patent
Jones et al.

(10) Patent No.: US 11,089,781 B2
(45) Date of Patent: Aug. 17, 2021

(54) INSECTICIDE/MITICIDE COMPOSITION BASED ON FATTY ACID SALTS

(71) Applicant: NATURIOL BANGOR LIMITED, Gwynedd (GB)

(72) Inventors: Owen Thomas Jones, Cardiff (GB); Mark Long, Gwynedd (GB)

(73) Assignee: Naturiol Bangor LTD, Gwyneed (GB)

( * ) Notice: Subject to any disclaimer, the term of this patent is extended or adjusted under 35 U.S.C. 154(b) by 0 days.

(21) Appl. No.: 15/758,119

(22) PCT Filed: Sep. 7, 2016

(86) PCT No.: PCT/GB2016/052761
§ 371 (c)(1),
(2) Date: Mar. 7, 2018

(87) PCT Pub. No.: WO2017/042554
PCT Pub. Date: Mar. 16, 2017

(65) Prior Publication Data
US 2018/0249710 A1  Sep. 6, 2018

(30) Foreign Application Priority Data
Sep. 7, 2015  (GB) ...................................... 1515759

(51) Int. Cl.
*A01N 37/12* (2006.01)
*A01N 37/00* (2006.01)
*A01N 37/06* (2006.01)
*A01N 37/02* (2006.01)

(52) U.S. Cl.
CPC ............. *A01N 37/06* (2013.01); *A01N 37/02* (2013.01)

(58) Field of Classification Search
CPC ................................ A01N 37/06; A01N 37/02
See application file for complete search history.

(56) References Cited

U.S. PATENT DOCUMENTS

| 5,030,658 | A | 7/1991 | Salloum et al. |
| 5,093,124 | A | 3/1992 | Kulenkampff |
| 5,994,269 | A | 11/1999 | Bugg |
| 6,930,075 | B1 | 8/2005 | Mason |
| 7,820,594 | B2* | 10/2010 | Coleman ................ A01N 37/02 424/404 |
| 2010/0297273 | A1 | 11/2010 | Lederman |
| 2012/0046362 | A1 | 2/2012 | Kawahara et al. |

FOREIGN PATENT DOCUMENTS

EP  0617888 A1  10/1994

* cited by examiner

*Primary Examiner* — Shobha Kantamneni
(74) *Attorney, Agent, or Firm* — Stites & Harbison PLLC; Richard S. Myers, Jr.

(57) ABSTRACT

The present proposals relate to an insecticide or miticide composition which demonstrates low phytotoxicity even at relatively high concentrations combined with highly effective insecticidal and miticidal activity. The composition comprises: a fatty acid/amino acid salt, the fatty acid component comprising: one or more unsaturated fatty acids having from 14 to 22 carbon atoms; and one or more saturated fatty acids having from 8 to 18 carbon atoms; wherein the one or more saturated fatty acids having from 8 to 18 carbon atoms forms at least 15 wt. % of the fatty acid component, and wherein the weight ratio of (unsaturated fatty acids having from 14 to 22 carbon atoms) to (saturated fatty acids having from 8 to 18 carbon atoms) is at least 1. Uses of the compositions and methods of killing insects or mites using the compositions also form part of the proposals.

3 Claims, 1 Drawing Sheet

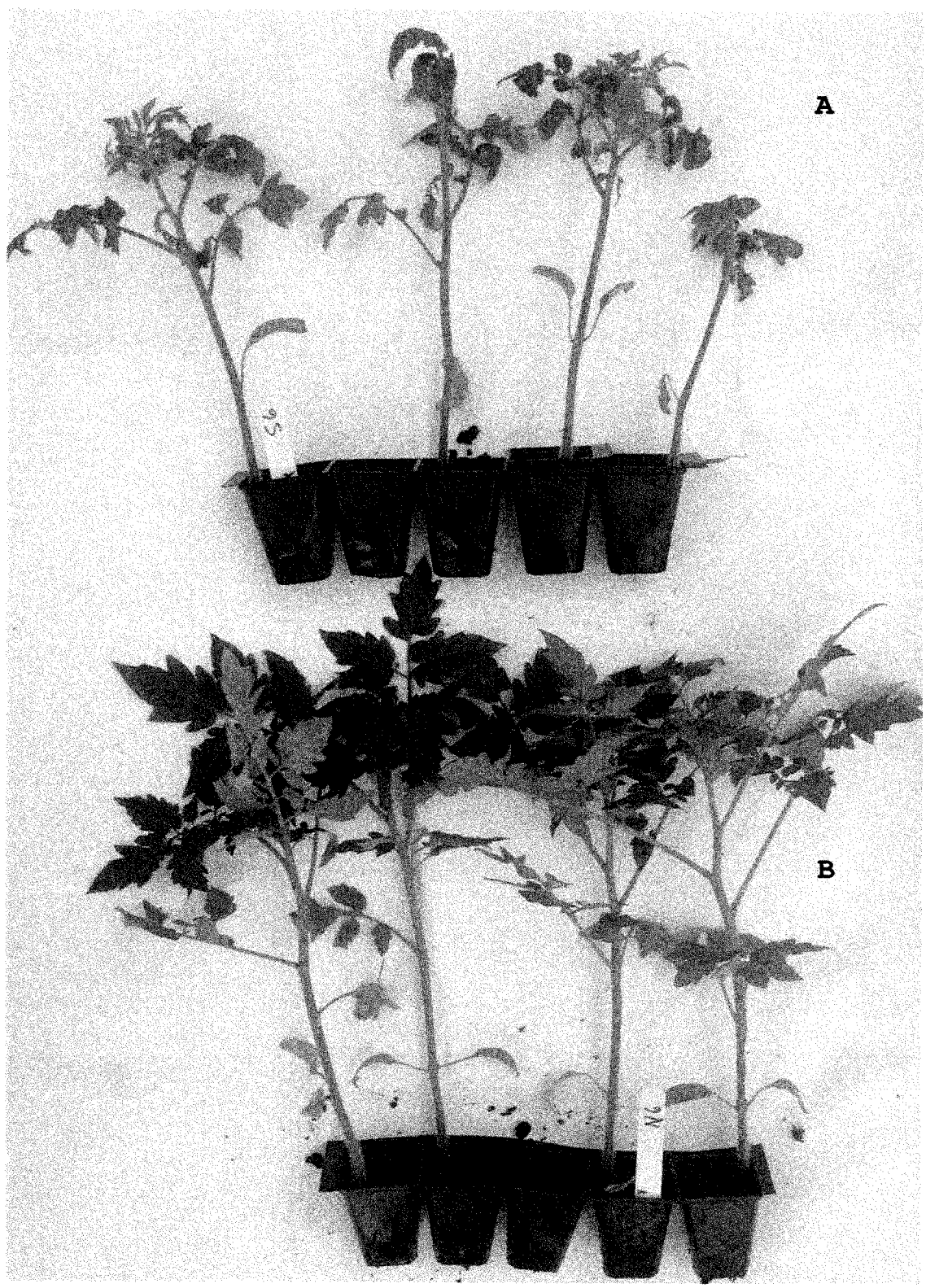

INSECTICIDE/MITICIDE COMPOSITION BASED ON FATTY ACID SALTS

CROSS REFERENCE TO RELATED APPLICATIONS

This application is a § 371 National State Application of PCT/EP2016/052761 filed Sep. 7, 2016, which claims priority to GB 1515759.7 filed Sep. 7, 2015.

The invention relates to pesticide compositions, in particular compositions having insecticide and/or miticide activity.

The salts of some fatty acids are known to be useful as insecticides or miticides and fatty acid salts having from 8 to 20 carbon atoms are known to display some insecticidal properties. However fatty acid salts having a carbon chain length below about 12 are known to also display phytotoxic properties. In order to achieve the pesticidal effects, the fatty acid salts need to directly contact the target pests to disrupt the structure and permeability of the insect cuticular cell membranes damaging the membrane and, ultimately, killing the pest. Therefore, pesticides based on fatty acid salts are contact pesticides requiring direct application to the pest to be effective.

Fatty acid salt pesticides are most effective on soft-bodied insects and mites such as aphids, mealybugs, spider mites, thrips, and whiteflies. Many pollinators and predatory insects such as lady beetles, bumblebees and syrphid flies are relatively unaffected.

Fatty acid salt compositions have low mammalian toxicity and are compatible with other forms of biological control such as predators and parasites, microbial pesticides and semiochemicals.

EP 0 617 888 describes pesticidal compositions including a mixture of a fatty acid salt and an adjuvant to increase spreadability of the fatty acid salt, the adjuvant being either a fatty alcohol of 4-18 carbon atoms, or a fatty acid methyl- or ethyl-ester of 4-18 carbon atoms.

U.S. Pat. No. 5,030,658 describes arthropodicidal compositions which include a mono alpha carboxylic acid with 8-20 carbon atoms or a metal salt thereof, with a metal ion sequestering agent, chelating agent, or surfactant.

The requirement for direct contact with the pest means that these fatty acid salt compositions are applied directly to plants, typically by spraying. However, these compositions exhibit some phytotoxic effects if they are applied at concentrations in water above about 2% w/w of the fatty acid in solution. At these higher concentrations, leaf damage, e.g. leaf scorching, is observed in some susceptible crops. For example, cole crops and some ornamental plants are especially susceptible to leaf scorching. If the concentrations are even higher, e.g. around 6% w/w of the fatty acid in solution, the compositions can exhibit severe phytotoxicity.

These disadvantages can also vary depending on the hardness of the water with which the compositions are typically mixed for application. In harder water areas, the compositions may be less effective and more toxic to the treated plants.

Therefore, a pesticide composition, in particular an insecticide and/or miticide, which maintains effectiveness against pests but demonstrates reduced phytotoxicity, in particular leaf scorching, would be beneficial.

Furthermore, the known compositions start to show reduced pesticidal properties if the concentration of the composition is below about 1 wt. % fatty acid. So the known compositions have a relatively narrow concentration window, an amount of the composition corresponding to about 1-2 wt. % fatty acid diluted in water, in which they are effective as pesticides but do not demonstrate significant phytotoxicity. This can be difficult to achieve in practice, especially if the compositions are sold in concentrated form for dilution by the end user. This narrow window can also mean that local variation in concentrations due to variable application of the solution to the plants can lead to either local ineffectiveness or local phytotoxicity; either of which is undesirable. Therefore a pesticide composition which has a broader effective concentration window with low phytotoxicity would be beneficial.

In one aspect, the present proposals relate to fatty acid salt compositions having insecticidal or miticidal activity and having reduced phytotoxicity. The present proposals also relate to such compositions for use as an insecticide and/or miticide. Uses of, and methods of using these compositions for killing insects and/or mites on a plant also form part of the present proposals.

Methods of forming such insecticidal or miticidal compositions and compositions formed by those methods also form part of these proposals.

In the most general aspect, the present invention provides an insecticide or miticide composition comprising:

a fatty acid/amino acid salt, the fatty acid component comprising one or more unsaturated fatty acids having from 14 to 22 carbon atoms, and one or more saturated fatty acids having from 8 to 18 carbon atoms;

wherein the one or more saturated fatty acids having from 8 to 18 carbon atoms forms at least 15 wt. % of the fatty acid component, and wherein the weight ratio of (unsaturated fatty acids having from 14 to 22 carbon atoms) to (saturated fatty acids having from 8 to 18 carbon atoms) is at least 1.

In a further aspect of the present invention these compositions are provided for use as an insecticide or miticide.

Further aspects relate to the use of such a composition for killing insects and/or mites on a plant.

BRIEF DESCRIPTION OF THE FIGURES

FIG. 1, shows results of treatment of tomato seedlings with Savona™ and the composition of Example 3 as described in Example 21. Image "A" shows the seedlings treated twice with 6 wt. % Savona™ and Image "B" shows seedlings treated twice with the composition of Example 3 at 6 wt. % fatty acid concentration.

DETAILED DESCRIPTION

The present proposals refer to "phytotoxicity" of the compositions and the advantageous lower phytotoxicity of the present compositions as compared to known compositions. When the present proposals refer to "lower" phytotoxicity, this means that the toxic effect on plants is lower under a given set of test conditions, e.g. at a given concentration. Phytotoxic effects may be measured in a number of different ways but preferably phytotoxicity is measured herein according to the principals set out in OEPP/EPPO Bulletin (2014) 44(3), 265-273 "PP 1/135 (4) Phytotoxicity assessment".

When considering the fatty acid component used in the present proposals there are some characteristics of different fatty acids that may be important. Fatty acids and fatty acid salts with a chain length of 14 carbon atoms or less exhibit some degree of cuticle-damaging properties. These shorter carbon chain length fatty acids and fatty acid salts have insecticidal and miticidal properties as a consequence because they can damage the cuticle of the insect causing insect death, typically by dehydration. However, these cuticle damaging properties can also damage the cuticle portions of plants. So, while strong pesticidal properties may be exhibited, some compounds are also phytotoxic. The present compositions mitigate the phytotoxic properties allowing the pesticidal effects to be exploited with little or no phytotoxicity.

The one or more saturated fatty acids in the fatty acid component are preferably selected from: caprylic acid (C8:0), capric acid (C10:0), lauric acid (C12:0), myristic acid (C14:0), palmitic acid (C16:0), margaric acid (C17:0), and stearic acid (C18:0). Preferably the one or more saturated fatty acids includes a higher proportion of 12 carbon atom fatty acids, preferably at least 15 wt. % of 12 carbon atom fatty acids.

The one or more saturated fatty acids having from 8 to 18 carbon atoms forms at least 15 wt. %, preferably at least 20 wt. %, preferably at least 30 wt. %, preferably at least 40 wt. % of the fatty acid component.

The one or more unsaturated fatty acids are preferably selected from:
Monounsaturated fatty acids such as:
  palmitoleic acid (C16:1),
  sapienic acid (C16:1),
  heptadecaenoic acid (C17:1)
  oleic acid (C18:1),
  elaidic acid (C18:1),
  vaccenic acid (C18:1),
  petroselinic acid (C18:1),
  gadoleic acid (C20:1),
  gondoic acid (C20:1),
  eicosenoic acid (C20:1)
  paullinic acid (C20:1),
  eruic acid (C22:1),
  nervonic acid (C24:1)
Diunsaturated fatty acids such as:
  linoleic acid (C18:2),
  eicosadienoic acid (C20:2),
  docosadienoic acid (C22:2),
Triunsaturated fatty acids such as:
  α-linolenic acid (C18:3),
  γ-linolenic acid (C18:3),
  pinolenic acid (C18:3),
  eleostearic acid (C18:3), Preferably the one or more unsaturated fatty acids comprises, or consists essentially of, one or more monounsaturated fatty acids. Preferably the one or more unsaturated fatty acids comprise, or consist essentially of, an unsaturated fatty acid having 16-20 carbon atoms, preferably 18 carbon atoms, preferably a C18:1 fatty acid. In some aspects, the unsaturated fatty acid having 18 carbon atoms is oleic or petroselinic acid.

Preferably the one or more unsaturated fatty acids having 14 to 22 carbon atoms, constitutes at least 50 wt. %, in some cases at least 55 wt. %, of the fatty acid component. In some aspects, the one or more unsaturated fatty acids having 14 to 22 carbon atoms comprises, or consists essentially of, a monounsaturated fatty acid having 18 carbon atoms (e.g. a C18:1 fatty acid) which forms at least 50 wt. %, in some cases at least 55 wt. %, of the fatty acid component.

In the fatty acid component as a whole, the weight ratio of (unsaturated fatty acids having from 14 to 22 carbon atoms) to (saturated fatty acids having from 8 to 18 carbon atoms) is at least 1, and may be at least 1.1, or at least 1.2, or at least 1.3, or at least 1.4, or at least 1.45.

In some cases, the fatty acid component as a whole may contain a mixture of naturally occurring fatty acids. For example, any of the following oils: babassu, borage, canola, corn, sunflower, cottonseed, evening primrose, linseed, soybean, wild almond, extra virgin olive, olive pomace, olive, pongamia, peanut, safflower, rice bran, nutmeg, palm, palm kernel, and coconut. In particular, any of these oils may be used to create a suitable mix of fatty acids as defined herein either alone or in admixture with other fatty acids or mixtures of fatty acids. For example, in some aspects, the fatty acid component includes, or may consist of, a mixture of coconut fatty acid with oleic acid or a fatty acid having a high oleic acid content (e.g. greater than about 60 wt. %, preferably greater than about 65 wt. %, preferably greater than about 70 wt. %, preferably greater than about 75 wt. %). In some aspects of this mixture, the weight ratio of coconut fatty acid to oleic acid or fatty acid having a high oleic acid content is between about 10:90 and about 60:40, in some cases between about 15:85 and about 60:40, in some cases between about 15:85 and 50:50, in some cases between about 20:80 and 50:50, in some cases about 40:60.

In some cases, the mixture may have a weight ratio of monounsaturated:saturated fatty acids between about 1.0 and 5.0, in some cases between 1.0 and 3.0, in some cases between 1.0 and 2.0, such as between about 1.2 and 1.8.

In some cases, the mixture may contain a low level of polyunsaturated fatty acids, preferably less than about 15 wt. %, preferably less than about 10 wt. %, preferably less than about 5 wt. %, such as less than about 1 wt. %.

The salts of fatty acids are formed by reaction of a fatty acid component as described above with a basic component. The basic component includes an amino acid component and may further include another basic compound which provides a cation, e.g. a metal cation, in solution. As the cation, alkali metals and alkali earth metals are preferred with sodium and potassium salts most preferred. As such, the basic compound may be KOH or NaOH, preferably KOH.

Reaction to form the salt of a fatty acid may be performed with the fatty acid in liquid form, e.g. heated to melt the fatty acid if necessary. The basic component, is preferably added to the liquid fatty acid, in approximately equal portions over a time period of between about 1 and 10 minutes. For efficient mixing during this addition step, the basic compound (e.g. KOH or NaOH) is preferably in solution. Following addition, the reaction is preferably stirred for a period of up to 3 hours. Throughout the reaction, the mixture is heated if necessary to keep the mixture in liquid form, e.g. heated to between about 60° C. and about 100° C., e.g. about 70° C. or about 80° C., depending on the melting point of the fatty acid used, although in some cases, the reaction may be performed entirely at room temperature without any external heating.

As noted above, the basic component comprises an amino acid component. As the amino acid component, any amino acid may be used. Naturally occurring amino acids are preferred, e.g. an amino acid selected from arginine, histidine, lysine, aspartic acid, glutamic acid, serine, threonine, asparagine, glutamine, cysteine, selenocysteine, pyrrolysine, glycine, proline, alanine, valine, isoleucine, leucine, methionine, phenylalanine, tyrosine, and tryptophan.

In some aspects, the amino acid may be selected from the group of basic amino acids, e.g. arginine, histidine, or lysine. Preferably dibasic amino acids are used, e.g. arginine or lysine.

In some aspects, the amino acid is selected from arginine, lysine, and glycine.

In preferred aspects, the amino acid is selected from arginine or glycine, preferably arginine. Good insecticidal and miticidal effectiveness has been demonstrated with low phytotoxicity for compositions in which the amino acid component is arginine, glycine, or lysine, although glycine and lysine are slightly less effective. Also commercially available lysine has an unpleasant odour leading to a preference for the amino acid to be arginine.

In some aspects, a mixture of amino acids may be used.

Preferably the amino acid has the L-stereochemical configuration.

The basic component of the fatty acid/amino acid salt comprises an amino acid component. The basic component may further comprise another basic compound as noted above. To form the fatty acid/amino acid salt, the fatty acid component and the basic component are typically present in equimolar proportions so that the solution does not contain a significant excess of either component.

In some aspects, the amino acid component forms at least 15 mol. % of the basic component, in some aspects at least 20 mol. %, in some aspects at least 30 mol. %, or at least 40 mol. %, or at least 45 mol. % of the basic component. There is no particular upper limit on the proportion of the basic component made up by the amino acid component, however, the amino acid may be one of the more expensive ingredients in the compositions so, for economic reasons, the amount of amino acid in the basic component may in some cases be a maximum of about 95 mol. %, or 80 mol. %, or 70 mol. %, or 60 mol. %, or 50 mol. %.

The portion of the basic component that is not made up by the amino acid component may comprise another basic component as noted above.

In some aspects, the basic component comprises 15-95 mol. % amino acid and 85-5 mol. % KOH, in some aspects, 30-50 mol. % amino acid and 70-50 mol. % KOH.

Further components such as industrial methylated spirit (IMS) and/or propane-1,2-diol may also be present in the compositions as additional solvents.

Specific Combinations

All of the features defined herein are independently combinable with any of the other features or combinations of features to form specific combinations and preferences as appropriate. The following specific combinations of features are explicitly envisaged.

The fatty acid component comprising coconut fatty acid and oleic acid and the amino acid comprising arginine.

The fatty acid component comprising coconut fatty acid and oleic acid and an equimolar amount of the basic component comprising arginine and KOH.

The fatty acid component comprising coconut fatty acid and oleic acid in a coconut fatty acid:oleic acid weight ratio of between 35:65 and 45:55, e.g. about 40:60, and an equimolar amount of the basic component comprising arginine and KOH in an arginine:KOH molar ratio of 0.8-0.9:1.

Methods of forming the insecticide or miticide composition also form part of the present proposals. In preferred reactions to form the present compositions, the reaction can be performed as a "one-pot" synthesis. The method of forming a composition according to the present proposals may include the following steps in sequence.

1) Heating the fatty acid component to above its melting point;
2) Adding a metal base in solution to the molten fatty acid;
3) Adding an amino acid to the mixture; and
4) Stirring the mixture at a temperature above the melting point of the fatty acid component.

In some methods, the order of steps 2) and 3) may be swapped so the amino acid is added first followed by the metal base.

Additional components such as one or more of water, industrial methylated spirit, and organic solvent (e.g. propane-1,2-diol) may also be added either in step 3) or at the same time as addition of the amino acid.

Following the stirring step 4), the reaction mixture is allowed to cool to room temperature. Any loss of mass from the original reaction components may then be replaced with a suitable solvent, such as ethanol.

In alternative methods, an amino acid salt of a fatty acid and a metal salt of a fatty acid may be prepared as two separate components as described above and mixed subsequently.

In either method, the pH of the resultant composition may be adjusted to a desired pH range by addition of a suitable acidic or basic component. Preferably the pH is adjusted to be in the range pH 7-9, e.g. using HCl or KOH as appropriate.

Insecticide or miticide compositions of the present proposals may be provided as a concentrated composition, e.g. the reaction product as described above with no additional dilution. Alternatively, the composition may be diluted with water, e.g. deionised water, to reach an appropriate concentration of active ingredients for application to plants, and provided as a diluted product. This diluted product offers the advantage that the end user can simply use the composition without any further dilution step. For example, preferably the insecticide or miticide composition is provided at a dilution containing the fatty acid component at less than about 15 wt. %, preferably less than about 10 wt. %, preferably less than about 8 wt. %, more preferably less than about 6 wt. %, more preferably less than about 4 wt. %, most preferably about 2 wt. %. In preferred aspects the insecticide or miticide compositions of the present proposals are provided at a dilution containing the fatty acid component at between about 1 wt. % and about 15 wt. %, preferably between about 2 wt. % and about 10 wt. %, preferably between about 2 wt. % and about 8 wt. %, most preferably between about 2 wt. % and about 6 wt. %. At higher concentrations, phytotoxicity, e.g. leaf scorching, becomes more prevalent, e.g. above about 15 wt. % fatty acid component. At lower concentrations, e.g. below about 1 wt. % fatty acid component, the insecticidal and miticidal effectiveness decreases.

The present compositions have been demonstrated to have unexpectedly low phytotoxicity, e.g. not to exhibit leaf scorching, at relatively high concentrations e.g. 10 wt. % or even up to 15 wt. % fatty acid component. By comparison, known fatty acid metal salt insecticides typically exhibit some levels of phytotoxicity above about 2 wt. % and significant levels at about 6 wt. % fatty acid component. This is coupled with a decrease in pesticidal properties below about 1 wt. % in known compositions which gives users a relatively small concentration window of about 1-2 wt. % fatty acid component in which to work; between a drop-off in effectiveness and an unacceptable phytotoxicity. The present compositions present a distinct advantage in this respect in that the useful concentration range is broadened as set out above.

At 4 wt. % concentration of fatty acid component, good tolerance (i.e. lack of phytotoxicity) has been demonstrated for Beans (*Phaseolus vulgaris*); Broccoli (*Brassica oleracea*); Brussels sprouts, cabbage, and cauliflower (*Brassica oleracea*); Carrots (*Daucus carota*); Lettuce (*Lactuca sativa*); Melon (*Cucumis melo*); Swiss chard (*Beta vulgaris*), Spinach (*Spinacia oleracea*) and banana (*Musa acuminata*).

Also testing at 2 wt. % concentration of fatty acid component shows effectiveness against a wide range of insects and mites, such as brown plant hopper (*Nilaparvata lugens*); Glasshouse potato aphid (*Aulacorthum solani*); green peach aphid (*Myzus persicae*); Thrips (*Frankliniella occidentalis*); red spider mite (*Tetranychus urticae*); cowpea Bruchid Beetle (*Callosobruchus chinensis*); and whiteflies (*Trialeurodes vaporariorum*).

Use of, and methods of using, the present compositions for killing insects or mites on a plant is also part of the present proposals. For example the compositions are preferably used at any dilution, e.g. those dilutions preferred above, to provide effective insecticidal/miticidal properties coupled with low phytotoxicity. In preferred aspects, these methods relate to the killing of specific pests such as insects and mites selected from brown plant hopper (*Nilaparvata lugens*); Glasshouse potato aphid (*Aulacorthum solani*); green peach aphid (*Myzus persicae*); Thrips (*Frankliniella occidentalis*); red spider mite *Tetranychus urticae*); cowpea Bruchid Beetle (*Callosobruchus chinensis*); and whiteflies (*Trialeurodes vaporariorum*). Preferably these methods leave pollinators and predatory insects such as lady beetles, bumblebees and syrphid flies relatively unaffected.

Methods of forming the present compositions as described herein also form part of the present proposals. For example, a method involving the following steps:

1. dissolving a base (e.g. KOH) in a solvent (e.g. industrial methylated spirit (IMS) and optionally also including water).
2. Optionally adding a further solvent (e.g. propane-1,2-diol).
3. Adding the fatty acid component and mixing, optionally also with heating, e.g. to 30-70° C.
4. Adding the amino acid with mixing, optionally also with heating, e.g. to 30-70° C.

Compositions obtained by these methods also form part of the present proposals.

EXAMPLES

The invention is illustrated in the following examples. These examples do not limit the scope of the invention which is as defined in the claims.

Comparative Example A

A composition (300 g) was produced from the following ingredients.

|  | Mass/g | Wt. % | $M_r$/gmol$^{-1}$ | Mol | Eq |
|---|---|---|---|---|---|
| Coconut acid | 106.5 | 35.5 | 210.5 | 0.506 | 1 |
| Arginine | 35.7 | 11.9 | 174.2 | 0.205 | 0.41 |
| KOH | 16.8 | 5.6 | 56.1 | 0.299 | 0.49 |
| Industrial methylated spirit | 60 | 20.0 | — | — | — |
| Propane-1,2-diol | 30 | 10.0 | — | — | — |
| Deionised water | 51 | 17.0 | — | — | — |

Fatty acid components were heated in a round bottom flask at 70° C. until molten. The flask was fitted with a reflux condenser and a solution of KOH in ethanol was added in portions. The mixture was stirred for 30 min before adding the arginine, water, and propane-1,2-diol. An amber product was obtained and stirred at 70° C. for a further 2 hours before being allowed to cool to room temperature. Any loss of mass was made up with ethanol. The pH of the end product was 8.5.

| Component | Supplier |
|---|---|
| Coconut acid | Hockley |
| Arginine | Fisher |
| KOH | Fisher |
| Industrial methylated spirit | Fisher |
| Propane-1,2-diol | Fisher |

Example 2

A pesticide composition (100 g) was produced from the following ingredients.

|  | Mass/g | Wt. % | $M_r$/gmol$^{-1}$ | Mol | Eq |
|---|---|---|---|---|---|
| Oleic acid | 22.0 | 22.0 | 282.5 | 0.078 | 1 |
| Coconut acid | 14.4 | 14.4 | 210.5 | 0.068 | 0.87 |
| Arginine | 11.9 | 11.9 | 174.2 | 0.068 | 0.87 |
| KOH | 4.4 | 4.4 | 56.1 | 0.078 | 1 |
| Industrial methylated spirit | 20 | 20.0 | — | — | — |
| Propane-1,2-diol | 10 | 10.0 | — | — | — |
| Deionised water | 17.4 | 17.4 | — | — | — |

The composition was prepared using the method of Comparative Example A. The pH of the composition was 9.0 and was then adjusted to pH 8.9 (at 20° C.) by adding oleic acid dropwise.

[The oleic acid was supplied by BDH Chemicals].

Examples 3-12

The compositions listed in table 1 were prepared according to the following method.

1. Mixing was achieved by dissolving potassium hydroxide (KOH) in industrial methylated spirit (IMS) at room temperature. The water can also be added at this stage, making it far easier to solubilise the KOH, particularly for mixtures containing KOH at more than 4.5 wt. %.
2. Propane-1,2-diol is added after KOH has completely dissolved.
3. The fatty acid components are added to the mixture at room temperature. Mixing can be achieved at room temperature for some mixtures, others require heating to mix the fatty acids.
4. The amino acid is added to the fatty acid salt solutions with mixing until it is fully dissolved. This can be achieved at room temperature but dissolution is more rapid for mixtures stirred at higher temperatures.

TABLE 1

| Example | Fatty Acid 1 (wt. %) | Fatty Acid 2 (wt. %) | Amino Acid (wt. %) | KOH (wt. %) | IMS (wt. %) | Propane-1,2-diol (wt. %) | Water |
|---|---|---|---|---|---|---|---|
| 3 | Coconut 14.35 | Oleic 22.03 | Arg 11.88 | 4.38 | 20 | 10 | 17.37 |
| 4 | Coconut 7.3 | Oleic 29.68 | Arg 11.35 | 4.18 | 20 | 10 | 17.48 |
| 5 | Coconut 12.37 | Oleic 18.98 | Arg 20.45 | 0.48 | 20 | 10 | 17.73 |
| 6 | Coconut 15.67 | Oleic 24.05 | Arg 6.43 | 6.77 | 20 | 10 | 17.13 |
| 7 | Coconut 14.35 | Oleic 22.03 | Gly 8.05 | 8.2 | 20 | 10 | 17.37 |
| 8 | Coconut 14.37 | Stearic 22.05 | Arg 11.83 | 4.37 | 20 | 10 | 17.38 |
| 9 | Coconut 14.33 | Linoleic 22 | Arg 11.9 | 4.38 | 20 | 10 | 17.37 |
| 10 | Myristic 13.03 | Oleic 23.8 | Arg 11.48 | 4.23 | 20 | 10 | 17.45 |
| 11 | Palmitic 13.18 | Oleic 24.08 | Arg 11.1 | 4.1 | 20 | 10 | 17.53 |
| 12 | Stearic 13.47 | Oleic 24.17 | Arg 10.78 | 3.98 | 20 | 10 | 17.62 |
| B | Coconut 35.5 | — | Arg 11.9 | 5.6 | 20 | 10 | 17 |
| C | Coconut 20.3 | Oleic 15.6 | Arg 12.3 | 4.5 | 20 | 10 | 17.3 |

In Table 1, examples listed as B and C are comparative examples.

In Table 1:
"Coconut" is coconut fatty acid (as used in Comparative Example A and Example 2);
"Oleic" is oleic acid (as used in Comparative Example A and Example 2);
"Stearic" is stearic acid (C18:0, 99 wt. %);
"Linoleic" is linoleic acid (C18:2, 59 wt. %);
"Myristic" is myristic acid (C14:0, 98 wt. %);
"Palmitic" is palmitic acid (C16:0, 96 wt. %);
"Arg" is arginine (as used in Comparative Example A and Example 2);
"Gly" is glycine Additional notes about the examples in Table 1 are given below:

Example 3

Mixing can be achieved at room temperature or faster at temperatures up to 60° C.

Comparative Example B

Heating to 60° C. required for mixing.

Comparative Example C

Mixing achieved at room temperature or at 60° C.

Example 4

Mixing achieved at room temperature or at 60° C.

Example 5

Mixing can be achieved at room temperature, though it is preferable to mix at 60° C. to make the dissolution of arginine more rapid.

Example 6

Mixing achieved at room temperature or at 60° C.

Example 7

Mixing achieved at room temperature at 60° C., though glycine will remain as a suspension until further dilution with water.

Example 8

The formulation required heating to 70° C. to ensure proper mixing. Product solidified on cooling.

Example 9

Mixing achieved at room temperature or at 60° C.

Example 10

A temperature of 70° C. is required for mixing. A precipitate appeared on cooling.

Example 11

A temperature of 70° C. is required for mixing. Product solidifies on cooling.

Example 12

Heating to 70° C. is required to ensure proper mixing. Product solidifies on cooling.

The fatty acid content of the compositions described in Table 1 was determined by GC/MS analysis using a Stabil-waxMS 30 m×0.25 mm×0.25 μm column from Restek and a F.A.M.E Mix C8-C24 standard from Supelco with compositions set out in Table 2.

TABLE 2

| Example | C8:0 | C10:0 | C12:0 | C14:0 | C16:0 | C18:0 | C20:0 | C16:1 |
|---|---|---|---|---|---|---|---|---|
| 3 | 3.14 | 2.69 | 16.24 | 8.51 | 8.29 | 1.68 | 0.00 | 0.26 |
| 4 | 1.57 | 1.35 | 8.13 | 4.48 | 7.03 | 1.75 | 0.00 | 0.35 |
| 5 | 3.14 | 2.69 | 16.24 | 8.51 | 8.29 | 1.68 | 0.00 | 0.26 |
| 6 | 3.14 | 2.69 | 16.24 | 8.51 | 8.29 | 1.68 | 0.00 | 0.26 |
| 7 | 3.14 | 2.69 | 16.24 | 8.51 | 8.29 | 1.68 | 0.00 | 0.26 |
| 8 | 3.14 | 2.69 | 16.25 | 8.24 | 5.33 | 60.28 | 0.32 | 0.00 |
| 9 | 3.14 | 2.69 | 16.29 | 8.36 | 8.26 | 1.72 | 0.00 | 0.12 |
| 10 | 0.03 | 0.08 | 0.36 | 35.00 | 3.90 | 1.18 | 0.00 | 0.28 |
| 11 | 0.00 | 0.00 | 0.05 | 1.20 | 37.81 | 1.49 | 0.00 | 0.28 |
| 12 | 0.00 | 0.00 | 0.00 | 0.29 | 4.01 | 36.46 | 0.19 | 0.28 |
| B | 7.97 | 6.82 | 41.18 | 20.89 | 12.17 | 1.46 | 0.00 | 0.00 |
| C | 4.51 | 3.86 | 23.30 | 12.01 | 9.39 | 1.62 | 0.00 | 0.19 |
| D | 0.00 | 0.00 | 0.00 | 3.15 | 6.37 | 2.33 | 0.00 | 5.56 |

| Example | C18:1 | C18:2 | C18:3 | C22:1 | SFA | UFA | UFA:SFA |
|---|---|---|---|---|---|---|---|
| 3 | 50.30 | 8.89 | 0.00 | 0.00 | 40.55 | 59.45 | 1.47 |
| 4 | 64.30 | 11.04 | 0.00 | 0.00 | 24.31 | 75.69 | 3.11 |
| 5 | 50.30 | 8.89 | 0.00 | 0.00 | 40.55 | 59.45 | 1.47 |
| 6 | 50.30 | 8.89 | 0.00 | 0.00 | 40.55 | 59.45 | 1.47 |
| 7 | 50.30 | 8.89 | 0.00 | 0.00 | 40.55 | 59.45 | 1.47 |
| 8 | 2.86 | 0.90 | 0.00 | 0.00 | 95.93 | 3.76 | 0.04 |
| 9 | 22.53 | 36.89 | 0.00 | 0.00 | 40.47 | 59.54 | 1.47 |
| 10 | 50.64 | 8.53 | 0.00 | 0.00 | 40.55 | 59.45 | 1.47 |
| 11 | 50.64 | 8.53 | 0.00 | 0.00 | 40.55 | 59.45 | 1.47 |
| 12 | 50.30 | 8.47 | 0.00 | 0.00 | 40.76 | 59.05 | 1.45 |
| B | 7.24 | 2.28 | 0.00 | 0.00 | 90.49 | 9.52 | 0.11 |
| C | 38.11 | 7.02 | 0.00 | 0.00 | 54.69 | 45.32 | 0.83 |
| D | 73.65 | 8.93 | 0.00 | 0.00 | 11.85 | 88.14 | 7.44 |

SFA = Saturated fatty acids having 8 to 18 carbon atoms
UFA = Unsaturated fatty acids having 14 to 22 carbon atoms In Table 2, Comparative Example D is the commercially available insecticide composition "Savona" from Koppert, B.V.

Pesticidal Testing

Pesticidal effectiveness and phytotoxicity testing was undertaken for the compositions listed as Examples 3-12 and Comparative Examples B-D. Pesticidal efficacy was evaluated against a test species Large Hazel Aphid (*Corylobium avelianae*). Phytotoxicity was evaluated according to the principals set out in OEPP/EPPO Bulletin (2014) 44(3), 265-273 "PP 1/135 (4) Phytotoxicity assessment".

Compositions were diluted with water to 6 wt. % fatty acid salt concentration and applied by spraying to leaves infested with Large Hazel Apids. Visual assessment of numbers of aphids and phytotoxicity was carried out before spraying and again at 72 hours after spraying. Results are presented in Table 3.

TABLE 3

| Example | Phytotxicity | Efficacy |
|---|---|---|
| 3 | None | Excellent |
| 4 | None | Very Good |
| 5 | None | Good |
| 6 | Slight | Very Good |
| 7 | Moderate | Good |
| 8 | | Not tested |
| 9 | None | Good |
| 10 | None | Moderate |
| 11 | None | Good |
| 12 | None | Moderate |
| B | Severe | Minimal |
| C | Severe | Moderate |
| D | Slight | Very Good |

Phytotoxicity Categories:
None—No signs of phytotoxicity
Slight—A few scorching spots or discoloration of leaves
Moderate—Significant scorching spotting or discoloration of leaves but less than 50% of leaf area
Severe—Severe scorching spotting or curling of leaves with necrosis.

Efficacy Categories:
Minimal—less than 5% pests killed
Moderate—5% to less than 30% pests killed
Good—30% to less than 50% pests killed
Very Good—50% to less than 70% pests killed
Excellent—greater than 70% pests killed In addition to the results presented in Table 3, the tests using the compositions of Examples 4, 7, and 9-11 resulted in a slight white deposit remaining on the leaves 72 hours after application of the test solutions. In some cases, e.g. shortly prior to harvest, this may be undesirable.

The composition of Example 8 was not suitable for straightforward application to plants because they required heating to 70° C. to achieve mixing to make the composition but the composition solidified on cooling. At higher concentrations (e.g. 6 wt. % of fatty acids) the composition did not properly dissolve into solution and at lower concentrations (e.g. 2 wt. % of fatty acids), there still remained some solid composition in suspension.

Example 13

Additional phytotoxicity testing was undertaken using the composition of Example 3 above. Phytotoxicity was evaluated in banana clusters that still had flowers using test solutions at dilutions in water of 2 wt. %, 4 wt. %, and 6 wt. % fatty acid concentration. The test solutions were applied by spraying to banana clusters.

Two weeks following application, no damage was observed in any of the clusters. No discoloration or staining was noted on the banana skins. There was no visual difference between treated and untreated areas.

Example 14

Further phytotoxicity testing was undertaken using the composition of Example 3 above. The trials were done in a greenhouse at Linter Belgium. A series of four different plant species, belonging to different groups were sprayed till run-off and allowed to dry. A single application of the composition of Example 3 was used. The control groups were sprayed with tap water. The following plant species were tested:

Tomato (*Solanum lycopersicum*) var. Tiny Tim, representing fruit forming vegetables 1 blooming Sweet pepper (*Capsicum annuum*), representing fruit forming vegetables 2 non-blooming Chard (*Beta vulgaris* var. *cicla*), representing leafy vegetables Orchid (*Phalaenopsis amabilis*) fully blooming, ornamental All tests were undertaken using the composition of Example 3 to make up test solutions at dilutions in water of 2 wt. %, 4 wt. %, and 6 wt. % fatty acid concentration. No phytotoxicity was observed in any of the test species at any of the tested concentrations. However, no phytotoxitcity was observed using commercially available insecticide composition "Savona" ™ from Koppert, B.V. so further phytotoxicity testing was performed.

Example 15

Additional efficacy testing was undertaken using the composition of Example 3 above. The tests were performed in small greenhouses built for these tests at a facility on the Canary islands. In each greenhouse there were 12 eggplants, on which had been reared whiteflies to reach a good level of population.

Plants in one of the greenhouses were treated with a solution of the composition of Example 3 (4 ml concentrated product/100 ml solution–equivalent to 2 wt. % fatty acid concentration). The product was applied as a spray treatment so as to soak the leaves, both the upper and lower surfaces, at a dose of 50 ml of solution per plant. The other greenhouse plants constituted the untreated control.

Efficacy was measured by observing the abundance of individual whitefly on the black plastic floor covering, and on their presence in the rest of the greenhouse and on leaves of plants, 48 hours after treatment.

After 48 hours the product had very significantly decreased the number of individual whitefly in flight. On the leaves, fewer living whitefly, and some dead individuals were observed. On the ground a lot of dead individual whitefly could be observed.

In the untreated greenhouse, there were a large number of whiteflies in flight. On the leaves of the eggplants a greater number of individuals were observed compared with those on leaves in the treated greenhouse. On the floor just a few dead individuals are observed.

The conclusion is that the composition of Example 3 is effective against whitefly at a concentration of 2 wt. % fatty acid in solution.

Example 16

Additional efficacy testing was undertaken using the composition of Example 3 above. The test was performed in a greenhouse at a facility on the Canary islands using a total of 10 pepper plants having from 1-4 individual thrips per flower.

Half of the plants were treated with a solution of the composition of Example 3 at a dilution in water to a concentration of 2% fatty acids (4 mL of concentrated product/100 ml solution) and another 5 plants were left as untreated controls. The treatment was done by spraying, soaking flowers inside and outside, and on the whole plant, at a dose of 25 ml per plant. Efficacy was measured by observing the abundance of living and dead individual thrips in treated and untreated flowers 48 hours after treatment. Assessment was undertaken in 15 flowers.

Before treatment, 18 thrips were counted in the test plant group and 32 thrips in the control plant group. 48 hours after treatment, 10 living thrips and 17 dead individuals were counted in the test plant group and 34 living thrips and no dead individuals in the control plant group.

Example 17

Further efficacy testing was undertaken using the composition of Example 3 above. The composition of Example 3 was tested as a solution diluted in water at 2 wt. % fatty acid concentration. Testing was performed against four common pests and performance was evaluated against two commercial broad spectrum pesticides Savona (Koppert B.V.) and AgriTrap (Koppert B.V.) both of which are fatty acid-based compositions. In addition, for each pest, the composition of Example 3 was tested against a leading specialist pesticide which specifically targets that particular pest.

In each case, application was by direct spraying on the plants. The commercial solutions were diluted according to manufacturer's instructions. Assessment was by counting of the number of pests on the treated plants and comparison with the number of pests on the control plants. Results are shown in Table 4. In this table, the following classifications are used to assess effectiveness.

No Effect less than 25% reduction in pest number compared to control

Small Effect 25-50% reduction in pest number compared to control

Moderate Effect 50-75% reduction in pest number compared to control

Very Effective greater than 75% reduction in pest number compared to control

| Pest | No Effect | Small Effect | Moderate Effect | Very Effective |
|---|---|---|---|---|
| WFT | — | Savona (47%) AgriTrap (46%) | Example 3 (67%) | Vertimec (83%) |
| RSM | — | Savona (42%) | AgriTrap (59%) | Oberon (83%) Example 3 (77%) |
| FA | — | — | AgriTrap (73%) | Savona (79%) Example 3 (87%) Confidor (98%) |

-continued

| Pest | No Effect | Small Effect | Moderate Effect | Very Effective |
|------|-----------|--------------|-----------------|----------------|
| GW | — | — | — | Savona (79%)<br>Example 3 (82%)<br>AgriTrap (79%)<br>Oberon (77%) |

WFT = Western Flower Thrips (*Frankliniella occidentalis*) - 8 × 10 ml applications on Dianthus plants
RSM = Red Spider Mite (*Tetranychus urticae*) - 6 × 20 ml applications on Tomato "Tiny Tim" plants
FA = Glasshouse potato aphid = Foxglove Aphid (*Aulacorthum solani*) - 8 × 10 ml applications on Tomato "Tiny Tim" plants
GW = Greenhouse Whitefly (*Trialeurodes vaporariorum*) - 8 × 30 ml applications on Poinsettia plants Commercial compositions used in these tests were:
Vertimec®—Syngenta
Oberon®—Bayer CropScience
Savona™—Koppert B.V.
Confidor®—Bayer CropScience
AgriTrap®—Koppert B.V.

Example 18

Further phytotoxicity tests were carried out using a single application of the pesticide composition as described in Example 3.

The results showed that the pesticidal composition is not phytotoxic to Beans (*Phaseolus vulgaris*); Swiss chard (*Beta vulgaris*); Broccoli (*Brassica oleracea*); Brussels sprouts, cabbage, cauliflower (*Brassica oleracea*); Carrots (*Daucus carota*); Lettuce (*Lactuca sativa*); Melon (*Cucumis melo*); and Spinach (*Spinacia oleracea*) at a dilution of 4 vol. % concentration of fatty acid salts.

Furthermore, no phytotoxicity was demonstrated in these tests even at higher 6 vol. % concentration.

Example 19

Further tests for insecticidal and miticidal properties were carried out using the pesticide composition as described in Example 3.

The results showed effective pesticidal properties against the following pests: Brown plant hopper (*Nilaparvata lugens*), Green peach aphid (*Myzus persicae*) and Cowpea Bruchid Beetle (*Callosobruchus chinensis*).

Example 20

Further independent phytotoxicity testing was undertaken using the composition of Example 3 above. The composition of Example 3 was tested as a solution diluted in water at each of 2 wt. %, 4 wt. %, and 6 wt. % fatty acid concentration. These compositions were evaluated for phytotoxicity at the same 2 wt. %, 4 wt. %, and 6 wt. % fatty acid concentrations against a commercial broad spectrum pesticide Savona™ (Koppert B.V.) which is a fatty acid-based composition.

Flowers (at two stages of maturity—freshly opened flowers and mature flowers) and buds about to open from rose flowers (variety Breda Colvin) were treated with a single application of each test composition. Six replicates of each of the three ages of flower were, inserted in florist's Oasis. The flowers and buds were each sprayed with 1 ml of the relevant composition. Symptoms of damage were visually assessed and graded two days after spraying and again three days after spraying. Roses were chosen as a test subject due to their known extreme sensitivity.

Symptoms of damage to petals could be clearly assessed visually as shrivelling and as brown necrosis.

2 wt. % Fatty Acid Concentration

Composition of Example 3

Mature flowers showed small amounts of damage at 2 days and more damage at 3 days.

Newly opened flowers showed no damage at 2 days but some damage at 3 days.

Savona™

Mature flowers showed more damage than composition of Example 3 at 2 days.

Three of six newly opened flowers at 2 days and all six at 3 days showed damage.

4 wt. % Fatty Acid Concentration

Both composition of Example 3 and Savona showed more damage of all open flowers than at 2 wt. % concentrations 6 wt. % Fatty Acid Concentration Both composition of Example 3 and Savona showed more damage of all open flowers than at 4 wt. % concentrations.

Flower Buds

There was no evidence that 2 wt. % of either preparation affected opening of buds. At 4 wt. %, there was some evidence that bud burst was inhibited (balling) with both preparations. At 6 wt. % of both preparations, none of the buds was able to open.

Conclusions

Both preparations caused some petal damage even at 2 wt. %. This not unexpected in treatment of roses due to their high sensitivity. There was a suggestion that the composition of Example 3 was less damaging at 2 wt. % than Savona at 2 wt. %.

Example 21

Further independent phytotoxicity testing was undertaken using the composition of Example 3 above. The composition of Example 3 was tested as a solution diluted in water at each of 2 wt. %, 4 wt. %, and 6 wt. % fatty acid concentration. These compositions were evaluated for phytotoxicity at the same 2 wt. %, 4 wt. %, and 6 wt. % fatty acid concentrations against a commercial broad spectrum pesticide Savona™ (Koppert B.V.) which is a fatty acid-based composition.

Tomato seedlings (variety Losetto) were sprayed with the solutions to runoff and sprayed again after seven days. Symptoms of damage were assessed and graded by visual analysis at seven days (before the second spray of the relevant composition) and again at a further seven days after the second spray. Control plants were also assessed after spraying with water at the same times as the test plants were sprayed with the test compositions.

The following symptoms of phytotoxicity were assessed:
Modifications in the development cycle
Thinning
Modification in colour (plant tissue not destroyed)
Necrosis
Deformations
Effects on quantity and quality of the yield The severity of phytotoxicity was visually assessed in each case on the scale: None, Slight, Moderate, Severe. Results are presented in Table 4 below.

TABLE 4

| Composition | 7-day results | | 14-day results | |
| --- | --- | --- | --- | --- |
| | Symptom | Severity | Symptom | Severity |
| Water (control) | None | — | None | — |
| SAV. 2 wt. % | None | — | None | — |
| SAV. 4 wt. % | None | — | Necrosis Deformations | Moderate |
| SAV. 6 wt. % | Necrosis Deformations | Moderate | Necrosis Deformations | Severe |
| Eg. 3 2 wt. % | None | — | None | — |
| Eg. 3 4 wt. % | None | — | Necrosis | Slight |
| Eg. 3 6 wt. % | None | — | Necrosis | Slight |

SAV = Savona (TM)
Eg. 3 = Composition of Example 3

It was concluded that sprays of a composition of Example 3 were clearly less toxic to tomato seedling than those of Savona™

A comparison of the seedlings after 14 days is shown in FIG. 1. Image "A" shows the seedlings treated twice with 6 wt. % Savona™ and Image "B" shows seedlings treated twice with the composition of Example 3 at 6 wt. % fatty acid concentration.

Example 22

In an independent test, the effect of a composition of Example 3 at low concentration on whitefly on dwarf French beans was examined. The plants were sprayed once with a 0.5 wt. % fatty acid solution in water. This resulted in essentially instantaneous immobilisation and death within 5 minutes of all the insects on the plant.

The invention claimed is:

1. A method of killing insects and/or mites on a plant comprising treating the plant with a composition having low phytotoxicity comprising:
    a fatty acid/amino acid salt, the fatty acid component comprising:
        one or more unsaturated fatty acids having from 14 to 22 carbon atoms; and
        one or more saturated fatty acids having from 8 to 18 carbon atoms;
    wherein the one or more saturated fatty acids having from 8 to 18 carbon atoms forms at least 15 wt. % of the fatty acid component, and wherein the weight ratio of unsaturated fatty acids having from 14 to 22 carbon atoms to saturated fatty acids having from 8 to 18 carbon atoms is at least 1, wherein the composition is provided at a dilution containing the fatty acid component at between 1 wt % and 15 wt % and wherein the amino acid component of the fatty acid/amino acid salt is selected from glycine, arginine, or lysine or a combination thereof; and
    wherein said fatty acid component comprises a mixture of coconut fatty acid and oleic acid.

2. The method of claim 1, wherein the amino acid component of the fatty acid/amino acid salt is arginine.

3. The method of claim 2, wherein the amino acid component is L-arginine.

\* \* \* \* \*